J. W. WILDER.
Carriage-Spring.
No. 57,647.
Patented Aug. 28, 1866
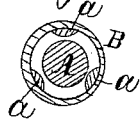
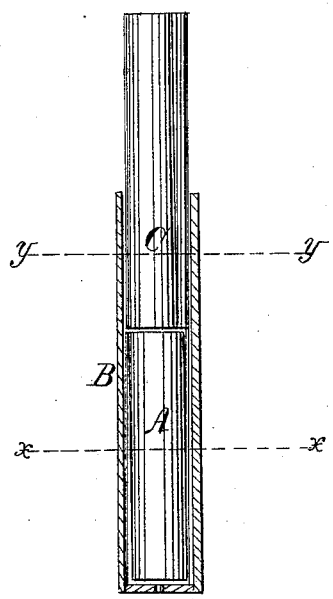
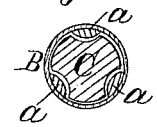
Witnesses:
F. A. Jackson
Wm Irwin
Inventor:
J. W. Wilder
Per Munn & Co
Attys

UNITED STATES PATENT OFFICE.

J. W. WILDER, OF NEW YORK, N. Y., ASSIGNOR TO HIMSELF AND EBENEZER BUTTERICK, OF SAME PLACE.

IMPROVEMENT IN OPERATING INDIA-RUBBER SPRINGS.

Specification forming part of Letters Patent No. 57,647, dated August 28, 1866.

*To all whom it may concern:*

Be it known that I, J. W. WILDER, of the city, county, and State of New York, have invented a new and useful Improvement in Operating India-Rubber Springs; and I do hereby declare that the following is a full, clear, and exact description thereof, which will enable those skilled in the art to make and use the same, reference being had to the accompanying drawings, forming part of this specification, in which—

Figure 1 represents a longitudinal central section of this invention. Fig. 2 is a horizontal section of the same, taken in the plane indicated by the line $x\ x$, Fig. 1. Fig. 3 is a similar section in the plane indicated by the line $y\ y$ in Fig. 1.

Similar letters of reference indicate like parts.

This invention consists in the arrangement of a protecting-case and plunger, in combination with a long and comparatively thin piece of india-rubber, in such a manner that when said piece is exposed to a pressure tending to compress its ends the protecting-case prevents the same from doubling up and retains it in position to sustain the pressure acting on it; and, furthermore, by the protecting-case the india-rubber is permitted to expand throughout its whole length, and a spring of great power and activity is obtained at a comparatively trifling expense.

A represents a piece of india-rubber, which may be cylindrical or polygonal, or of any other desirable form or shape, (though I use, by preference, cylindrical pieces,) and the diameter or thickness of which is very small when compared with its length. If a piece of india-rubber of this kind is exposed to an end-pressure it expands first in the middle, and if the pressure increases it doubles up, and its action as a spring is lost.

This difficulty is obviated by inclosing the piece of india-rubber in a case, B, of sheet metal or any other suitable material, and of such a size and shape that the india-rubber is free to expand as the same is compressed.

In the drawings I have shown ribs $a$ on the inner circumference of the cylindrical case B, said ribs being of such a size that they support the india-rubber and permit the same to expand freely throughout its whole length; but it is obvious that the shape of the case may be changed in various ways without changing the result.

In the case is fitted the plunger C, and when a pressure is exerted on said plunger the india-rubber, being prevented from doubling up, is compressed uniformly throughout its whole length, and a spring of very great power and activity is obtained.

Having thus described my invention, I claim as new and desire to secure by Letters Patent—

The protecting-case B and plunger C, in combination with a piece of india-rubber, A, substantially as and for the purpose described.

The above specification of my invention signed by me.

J. W. WILDER.

Witnesses:
WM. F. MCNAMARA,
W. HAUFF.